Jan. 2, 1968  S. E. GARDNER  3,360,891
EXTENDABLE PORTABLE HOUSE
Filed March 23, 1966  2 Sheets-Sheet 1

INVENTOR.
STEWART E. GARDNER

BY Kimmel, Crowell & Weaver
ATTORNEYS.

Jan. 2, 1968  S. E. GARDNER  3,360,891
EXTENDABLE PORTABLE HOUSE
Filed March 23, 1966  2 Sheets-Sheet 2

INVENTOR
STEWART E. GARDNER
BY Kimmel, Crowell & Weaver
ATTORNEYS.

United States Patent Office

3,360,891
Patented Jan. 2, 1968

3,360,891
EXTENDABLE PORTABLE HOUSE
Stewart E. Gardner, Box 217, Bristol, Ind. 46507
Filed Mar. 23, 1966, Ser. No. 536,746
10 Claims. (Cl. 52—69)

This invention relates to a house having means provided for expanding the internal space in said house. Because of the importance of portable houses, the invention relates more particularly to expandable portable houses having a hinged member comprising all or part of a wall of the portable house; however, the expandable features are not limited to portable houses, but may be used in houses of all types. More particularly, this invention relates to a portable house having an expandable portion comprised entirely of hinged rigid members.

With the increased interest and use of our highways and our public parks and camp grounds there has been an increasing need for light-weight portable housing. Such portable houses commonly take one of two forms; first, the trailer house type which is towed behind an automobile or other vehicle, and secondly, the camper type which comprises a small compact house which may be loaded into the bed of a pickup truck or other vehicle and forms a part of the vehicle. In addition to these two commonly used portable houses, there are also self-propelled portable houses in which the house features are combined with the engine, chassis, and other drive features. In all types of portable houses, however, there are several common problems, one of the most serious being the problem of providing sufficient space for comfort and at the same time maintaining the portable house in a configuration and within dimensions which permit it to be pulled or carried along the highways.

In addition to the limitations which the law commonly places upon the dimensions of vehicles intended for travel along the highways, there are often serious difficulties in transporting an excessively large vehicle along narrow winding mountain roads, as is often desirable for those who wish to take advantage of the great natural beauty of our country.

It is, therefore, an object of this invention to provide an improvement in portable houses whereby the house may be transported from place to place in a collapsed position and may be expanded to a larger size upon reaching the desired destination.

One of the most serious inconveniences of most existing portable houses is the shortage of sleeping space. Frequently it is necessary for users of these portable houses to carry additional equipment, as for example beds, tents, and the like, and to provide additional sleeping area outside the portable houses. It is an object of this invention to provide a portable house which may be conveniently transported in its collapsed position to a desired location and easily expanded at the desired location to form an additional sleeping area.

While such problems are primarily related to those using portable houses, such as campers or trailer houses, a similar problem sometimes faces those who construct and use stationary houses. This may occur, for example, at construction sites or other places where it is desirable to construct rapidly a large number of houses for use for a short period of time or for an indefinite period of time. The common practice is to pre-fabricate such houses and to carry them to the location in a knocked-down condition and to construct them on the side. It is, therefore, an object of this invention to provide an expandable wall structure for such houses.

It is well known to construct portable housing structures in which a flexible portion of the house is constructed all or in part of a flexible or foldable material, for example canvas and more recently plastic. Housing structures constructed of such materials, however, do no wear well and are easily damaged. It is an object of this invention to provide an expandable housing structure in which the expandable portion of the house is constructed entirely of strong rigid materials for prolonged wear and resistance to damage.

It is also known to construct expandable portions of houses, in particular, portable housing structures, entirely of rigid materials; however, such housing structures are frequently inconvenient to use, add considerable weight to the portable house and, probably most importantly, do not collapse conveniently for transportation. For example, housing structures of this general class are known in which the expandable portion moves into the main portion of the portable house for transportation. While this offers many advantages, there are also serious inconveniences to this type of structure, for example, it reduces the available storage space inside the house, and makes it inconvenient or impossible to use the house in any but the fully expanded position. It is, therefore, an object of this invention to provide a portable expandable house having an expandable portion constructed entirely of rigid materials which may be collapsed for transportation without occupying portions of the unexpanded house.

Additional objects of this invention will become apparent from the following drawings.

Figure 1:
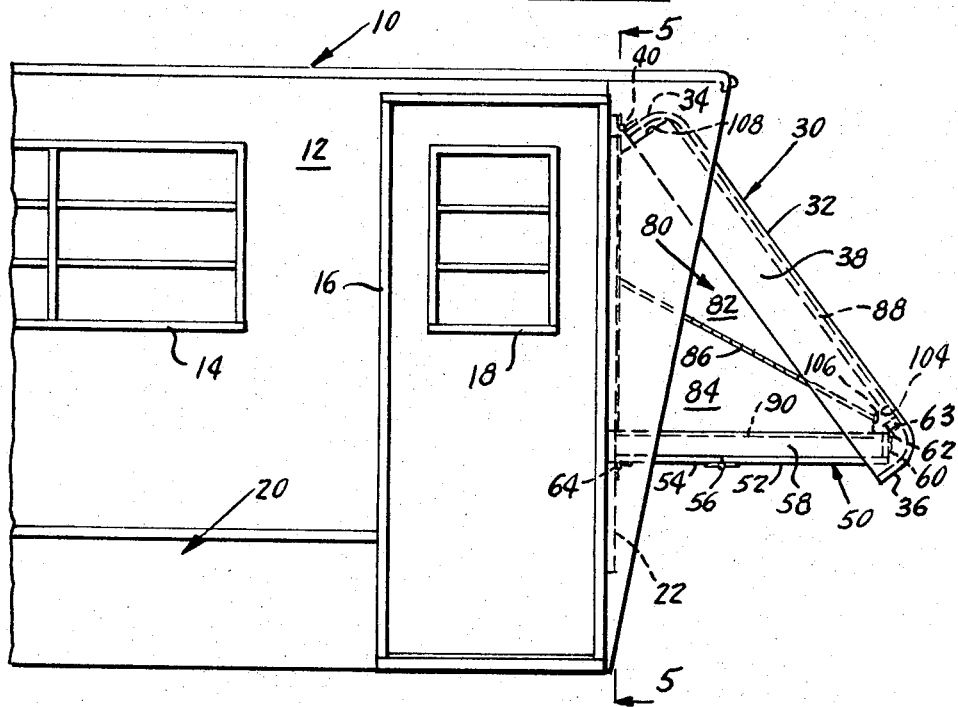
FIGURE 1 is a portion of a portable house in elevation showing the arrangement of the expandable ground structure.

Referring now to FIGURE 1, portable house 10 includes wall 12 having therein windows 14, door 16, which carries on it windows 18, and in its lower portion an indent shown generally at 20 which permits the portable house 10 to rest in the bed of a pickup truck, not shown for purposes of clarity.

Portable house 10 also has wall 22 which carries upon it a movable wall structure, shown generally at 30, which is the subject of this invention.

Movable wall structure 30 comprises a covering member 32 which includes extensions 34, 36, and 38, and is attached to wall 22 by means of hinge 40.

The floor of extendable portion 30 is shown generally at 50 and comprises panel 52 and panel 54 which are joined together by hinge 56. Preferably floor 50 includes upright members 58 which are attached at each end of floor 50. It should be noted however that upright 58 is secured only to panel 52 of floor 50 and rests freely upon panel 54 in the expanded position as shown in FIGURE 1. Floor 50 also includes upright 60 which is attached to cover 32 by means of spring 62. Floor 50 is attached at the other end by hinge 64 to wall 22.

The wall member of expandable portion 30 is shown generally at 80 and comprises panel 82 and panel 84 joined by hinge 86. Wall 80 is connected to panel 32 by hinge 88 and to floor 50 by hinge 90.

Figure 2:
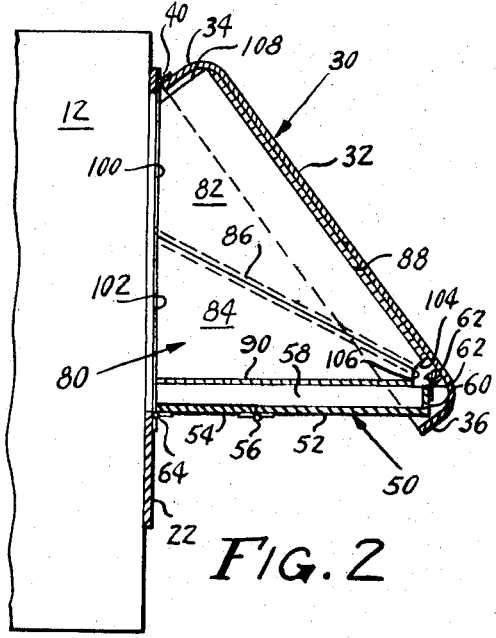
FIGURE 2 is a view in section of the portable wall structure in its expanded position.

Referring now to FIGURE 2, it will be noted that in the preferred embodiment panels 82 and 84 are generally triangular in shape and form a generally triangularly shaped wall 80. The ends of panels 82 and 84, when the house is in its expanded position as shown, rest snugly against the edge of wall 22 as shown generally at 100 and 102 forming a seal against the wind and the weather. The joint between panels 82 and 84, along hinge 86, forms in addition a toggle-like structure which tends to hold the expanded portion rigidly in position. The opposite ends of panels 82 and 84, shown at 104 and 106 are shaped to conform to the hinging arrangement between floor 50 and cover 32. In a similar manner the upper corner 108 of panel 82 is shaped to conform to the hinging arrangement between cover 32 and wall 22.

While it is not absolutely essential for the operation of this invention, it is preferred that all the hinges, 38, 62, 64, 88, 90, and 86, be of the type generally referred to as piano hinges. This type of hinge forms a tight strong joint of the type required in this invention.

Figure 3:
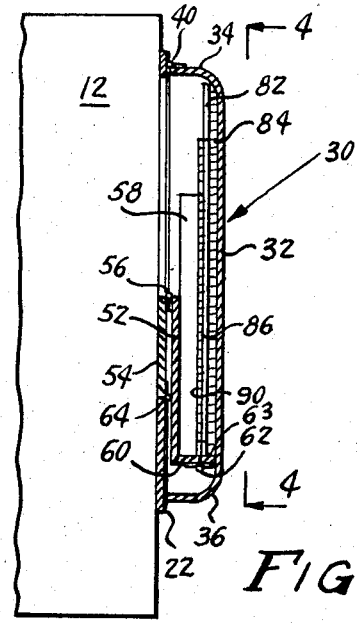
FIGURE 3 is a view in section of the portable wall structure in its collapsed condition.

FIGURE 3 shows the expandable wall structure in its collapsed position. In order to convert the expandable portion from its expanded position as shown in FIGURE 2, to the collapsed position, as shown in FIGURE 3, all that is necessary is that the toggle-like joint between panels 82 and 84 be broken, simply by a slight force exerted inwardly upon the joint formed by hinge 86 and the exertion of a small upward force on the joint formed by the hinge 56 between panels 52 and 54. Because of this unique hinging arrangement, the cover member 32 tends to move inwardly with the continued bending of the joints at hinge 65 and hinge 86 to the position shown in FIGURE 3.

The only step necessary to expand the house structure as shown in FIGURE 3, to the expanded position, as shown in FIGURE 2, is the outward and upward lifting of cover 32. A principal advantage of this invention lies in the counterbalancing arrangement of the panel structure. When the house is being expanded it is necessary to exert a force outwardly upon cover 32; however, during this motion the floor 50 is moving downwardly and thus aids in the outward movement of cover 32. In a similar manner when the house structure is being collapsed, much of the force necessary to cause the upward movement of floor 50 is supplied by the downward and inward motion of cover 32. It is possible by a careful arrangement of the position of hinges 56 and 86, in particular, to approach a nearly perfectly counterbalanced position so that only a very small force is required either to collapse or to expand the house structure. It is, of course, necessary to take into consideration the density of the particular materials used at various points in the structure. A reasonable estimate of the force necessary to operate the mechanism, either extending or retracting, would be up to fifteen pounds of pull. Theoretically it would be possible to counterbalance the system even more precisely; however, with only this small force required, even a small woman can operate the mechanism.

Figures 4, 5:
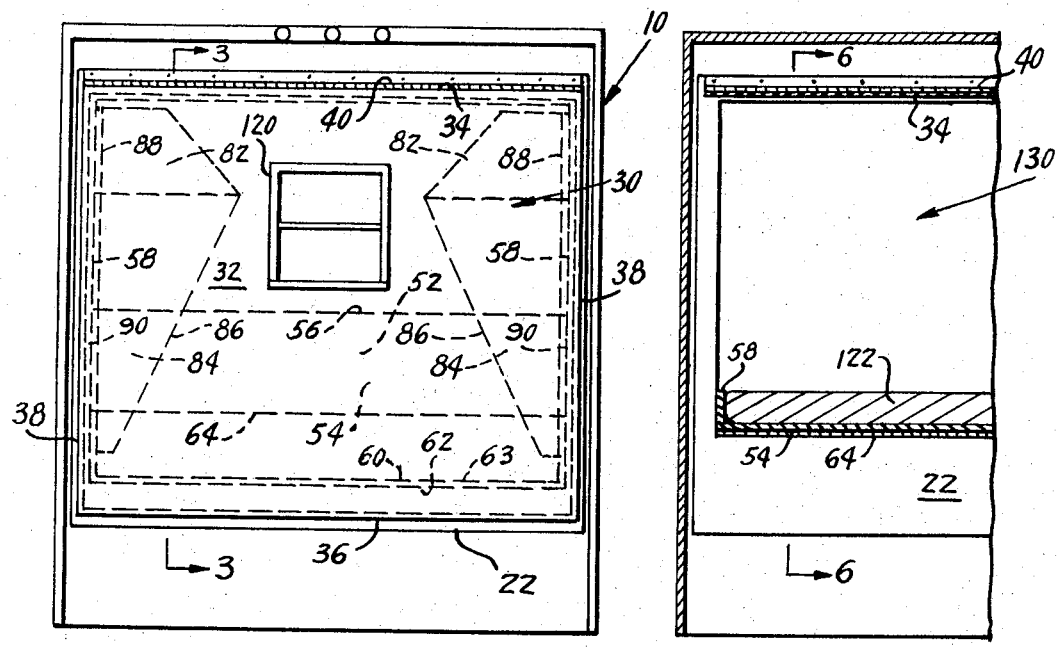
FIGURE 4 is a rear view of the portable house showing the outside of the expandable portion, taken substantially along line 4—4, of FIGURE 3.
FIGURE 5 is a rear view of the portable house showing the points of connection of the expandable wall structure, taken substantially along line 5—5 of FIGURE 1.

FIGURE 4 is a view of the rear of the portable house 10 showing the outside structure of expandable portion 30 including cover 32 which is hinged to wall 22 by a hinge 38. Wall 32 carries a window 120.

FIGURE 5 shows the rear of portable house 10 in partial cross-section with most of portable structure 30 removed. In addition to hinges 38 and 64 and panel 54 and upright 58, FIGURE 5 shows an extension 122 of wall 22 and the opening 130 over which cover 32 fits.

Figure 6:
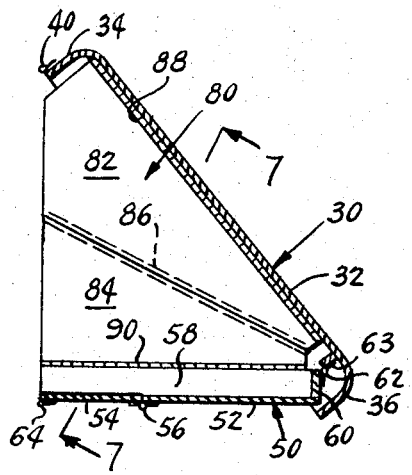
FIGURE 6 is a view in cross-section showing the structure of the portable wall panels taken substantially along line 6—6 of FIGURE 5.

FIGURE 6 shows in greater detail the construction of wall member 80 and the hinging of floor 50 to cover 32. In particular, FIGURE 6 shows member 63 to which hinge 62 is attached. Member 62 is a rigid cross-member securely fixed to panel 32.

Figure 7:
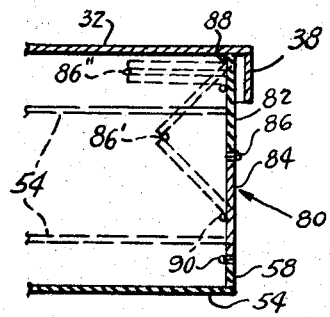
FIGURE 7 is a view in cross-section of the foldable wall structure taken substantially along line 7—7 of FIGURE 6.

FIGURE 7 is a cross-section of the sidewall 80 showing the operation of hinge 86 during the collapsing of extension 30. In the fully extended position hinge 86 forms a straight joint between panel 82 and panel 84, but as the extension 30 is collapsed, hinge 86 pivots causing the ends of panels 82 and 84 to move inwardly to the position shown at 86'. Further movement of cover 32 during the collapsing operation causes hinge 86 to pivot, bringing panels 82 and 84 into essentially parallel relationship as shown at 86''. This collapsing operation is, of course, accompanied by pivotal motion at hinges 88 and 90.

In the preferred embodiment, the portable house is constructed of wood with decorative paneling on the inside and covered with a metal skin, usually of aluminum. Similarly, the expandable portion is covered with a metal skin in all areas exposed to the weather.

While the use of tightly fitting piano hinges provides a nearly air-tight joint, it is desirable to use hinge covers in order to provide a completely air-tight joint. In addition, weather stripping is used at all joints which would otherwise allow wind, weather and dust to penetrate to the interior. Conventional rubber weather stripping seals are satisfactory for this purpose.

In the preferred configuration just described, the extended portion is in the form of a bed. While the portable house is being transported, the extension is collapsed forming a compact unit for transportation on highways and narrow country roads. The expandable portion is normally collapsed during storage and periods of nonuse also. It would, of course, be possible to utilize the additional space provided for any desirable purpose; however, the purposes most conveniently available is for providing additional sleeping space.

The obvious advantages in the durability of the mechanism, the convenient method of storage during transit, and the ease of changing from the collapsed to the expanded position make this invention of considerable importance. Because there are no parts of the mechanism which are not permanently attached by hinges to the whole of the mechanism, it is, practically speaking, air-tight. In addition, the device can be very easily, quickly, and conveniently changed from the expanded to the collapsed condition without the exertion of great force.

I claim:
1. In a house having a floor, a roof and a plurality of walls, the improvement wherein at least one of the walls includes movable members for expanding the portable house and comprises:
    a movable covering member for forming in a collapsed position at least a part of said wall and in an expanded position a covering for the expanded portion of the house,
    means hingably attaching the covering member to the house,
    foldable floor member for forming in the expanded position the floor of the expanded portion of the house,
    means hingably attaching the floor member to the house along a first side and to the covering member along the opposite side of the floor member,
    foldable wall members for forming in the expanded position the walls of the expanded portion of the house, each of said wall members comprising a plurality of rigid panels and means hingably joining said rigid panels, and
    means hingably attaching the wall members at one edge to the covering member and at a second edge to the floor member.

2. The invention of claim 1 wherein the house is portable.

3. The invention of claim 2 wherein the wall members of the expanded portion of the house are, in the expanded position, generally triangular in shape.

4. The invention of claim 3 wherein the wall members of the expanded portion of the house are formed of generally triangularly shaped rigid panels.

5. The invention of claim 2 wherein the floor member comprises a plurality of rigid panels and means hingably joining the panels together intermediate the sides of the floor member for forming a foldable joint in said floor member.

6. The invention of claim 5 wherein the floor member has an upright element secured at each end of the floor member to only one of the rigid panels.

7. The invention of claim 5 wherein the wall members of the expanded portion of the house are, in the expanded position, generally triangular in shape.

8. The invention of claim 7 wherein the wall member of the expanded portion of the house are formed of generally triangularly shaped rigid panels.

9. The invention of claim 8 wherein the floor member has an upright element secured at each end of the floor member to only one of the rigid panels.

10. The invention of claim 9 including a metal skin covering all externally exposed elements of the expandable portion.

References Cited

UNITED STATES PATENTS

| 2,355,340 | 8/1944 | Strope | 52—66 |
| 2,626,591 | 1/1953 | Mazur | 52—64 |
| 3,290,085 | 12/1966 | Damiani | 296—23 |

FOREIGN PATENTS

| 1,062,023 | 1953 | France. |

HENRY C. SUTHERLAND, *Primary Examiner.*

R. A. STENZEL, *Assistant Examiner.*